United States Patent
Hildebrand et al.

(10) Patent No.: US 6,253,047 B1
(45) Date of Patent: Jun. 26, 2001

(54) PRINTER MOTION QUALITY IMPROVEMENT WITH CROWNED GEAR DRIVE SYSTEMS

(75) Inventors: Robert E. Hildebrand; James M. Casella; Anand Narayan, all of Webster; Karl Sweitzer, Honeoye Falls; Anthony G. Poletto, Fairport, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/521,633

(22) Filed: Mar. 8, 2000

(51) Int. Cl.[7] ................................................... G03G 15/00
(52) U.S. Cl. ........................................................... 399/167
(58) Field of Search .................................. 74/665, 665 K; 464/147, 149, 157; 399/75, 117, 167

(56) References Cited
U.S. PATENT DOCUMENTS

| | | | |
|---|---|---|---|
| 2,335,504 | * 11/1943 | Gazda | 74/462 |
| 2,682,760 | * 7/1954 | Shenk | 64/9 |
| 4,524,643 | * 6/1985 | Ziegler et al. | 74/801 |
| 5,768,656 | * 6/1998 | Nagasue et al. | 399/75 |

* cited by examiner

Primary Examiner—Arthur T. Grimley
Assistant Examiner—Hoang Ngo

(57) ABSTRACT

In a printing apparatus with a component such as an imaging surface having critical drive motion uniformity, there is provide a drive system with at least one meshing pair of rotatable first and second drive gears, with at least one gear having gear teeth with a crowned outer engagement edge, with crowning sufficient to substantially increase the drive motion uniformity of the drive system in spite of alignment variations of said first and second gear axes of gear rotation. Preferably each meshing gear has all its gear teeth only half-crowned, on only one side, to allow for simple and low cost gear molding, but the gears are mounted to oppositely mesh their respectively half-crowned sides. The amount of crowning may be in the range of approximately 75–100 microns.

10 Claims, 5 Drawing Sheets

PRINTER MOTION QUALITY IMPROVEMENT WITH CROWNED GEAR DRIVE SYSTEMS

Disclosed in the embodiments herein is a system for improving the motion quality of the drive systems used in print engines, such as xerographic printers. In particular, there is disclosed an improved, low cost, and simple system for improving the drive motion control of such printer component drive systems, with the disclosed crowned gear drive system. It has been discovered in this printing art that surprising improvements in the evenness of critical printer component motion velocities can be provided with sufficient gear tooth lead edge crowing in the printer component drive systems. It has been discovered that the disclosed system can overcome prior motion error problems in driven printer components caused by normal gear axis alignment errors between the respective axes of rotation of mating gears, such as normally occurs in manufacturing and/or assembly tolerances and errors.

By thus reducing the criticality of the required degree of parallelism of the respective axes of rotation of the gears in a gear drive train, lower cost gear sets can be used to achieve the same acceptably high degree of motion smoothness in the output of printer component drives systems. The motion quality improvement provided by the disclosed drive systems may even enable the elimination in certain printer drive applications of typical "gear boxes" having rigid enclosing gear mounting box steel plate frames to hold all the gear shafts rotatably mounted therein with fully parallel axes of rotation.

Uniform drive motion is particularly critical for the movement of the photoreceptor or other imaging surface of a printer. Even very small fluctuations in the motion of a imaging surface relative to an imager can create highly visible defects in the resultant prints. Numerous prior patents have addressed corrections in such motion fluctuation image quality problems. For example, Xerox Corp. U.S. Pat. No. 5,153,644 issued Oct. 6, 1992 to Eugene L. Yang, et al, and various other references on this subject cited therein. Also noted are Xerox Corporation U.S. Pat. Nos. 5,937,241 and 5,845,175 on gear mounts for enhanced motion quality.

The increasing demand for high resolution color printers, with their superposed plural images of different colors, and their requirements for large uniform color solid image areas, has added to printer motion control criticality. Such printers are especially prone to customer observable image defects in print quality, including those due to motion errors.

Printer drive system noise, especially for printers in office environments, is also an issue of concern to printer manufacturers. Furthermore, it is increasingly subject to various governments regulations.

The difficulty and cost of manufacturing gears with a precise desired amount of gear tooth crowning, instead of straight teeth edges, is a limiting factor in their utilization. The system of the disclosed embodiments is believed to be particularly applicable to accurately molded, relatively low cost, plastic gears. Examples of precision plastic gear molding art, especially with gas injection molding, are disclosed in co-pending Xerox Corp. U.S. provisional application No. 60/156,220 filed Sep. 27, 1999, entitled "Plastic Injection Molding with Reduced Dimensional Variations Using Gas Pressure and Secondary Plastic Injection," by Robert E. Hildebrand, and art cited therein, including U.S. Pat. Nos. 5,707,659; 5,639,405; and 5,151,278. (An alternatives is compressed powdered metal gears.) Since, as disclosed herein, crowing of only one (or two) outer edges of each gear tooth of only one gear of a gear set need be modified to achieve the desired results, relatively little mold and/or tooling changes in manufacturing are required. In particular, with only single edge or corner crowning of the gear teeth, as disclosed herein, a simple two-part mold with a simple draw can be used to make the subject gear, and avoid any parting line flashing along the tooth center, thus providing a significant cost advantage in producing low cost crowned gears suitable for the subject substantially improved motion uniformity printer drive systems.

Various types of different gear crowning for different purposes, and manufacturing methods, are known in other arts, and need not be described herein. For example, it is known in the automobile industry to provide gear tooth crowning at magnitudes of 0 to 10 microns to control audio noise in gear meshes of automobiles. Crowning of 6–12 microns is typically standard.

There are also articles available such as: "Method for Cutting Straight Bevel Gears Using Quasi-Complementary Crown Gears", by Koreaki Ichino, Hisashi Tamura and Kazumasa Kawasaki, available on the Internet at "http://www.gear-net.com" as Report 5 on the Japan Gear-Net website, pages 1–13 (initial publication date unknown). It discloses hobbing metal gear teeth to provide crowning.

A specific feature of the specific embodiments disclosed herein is to provide in a printing apparatus with at least one component having critical drive motion uniformity and a drive system providing drive motion to said component having said critical drive motion uniformity; the improvement wherein: said drive system comprises at least one engaged pair of rotatable first and second drive gears with substantially parallel respective first and second axes of gear rotation, said first and second axes having slight alignment variations relative to one another, and wherein at least said first drive gear has gear teeth having at least one crowned outer edge, said gear tooth outer edge crowning being sufficient to substantially increase said drive motion uniformity of said drive system in spite of said alignment variations of said first and second axes of gear rotation.

Further specific features disclosed in the embodiments herein, individually or in combination, include those wherein said gear teeth of said first drive gear have two crowned outer engagement edges; and/or wherein said rotatable first and second drive gears are oppositely lead circular half-crowned; and/or wherein said component with said critical drive motion uniformity is an imaging surface; and/or wherein said gear teeth of said first drive gear have outer edges which are substantially linear other than at said crowned outer edge; and/or wherein said component with said critical drive motion uniformity is a photoreceptor belt; and/or wherein said rotatable first and second drive gears are oppositely half-crowned, and are plastic molded gears; and/or wherein said crowning is at least approximately 75 microns; and/or wherein said crowning is in the range of approximately 75–100 microns.

As to specific components of the subject apparatus, or alternatives therefor, it will be appreciated that, as is normally the case, some such components and methods are known per se in other apparatus or applications which may be additionally or alternatively used herein, including those from art cited herein. All references cited in this specification, and their references, are incorporated by reference herein where appropriate for teachings of additional or alternative details, features, and/or technical background. What is well known to those skilled in the art need not be re-described herein.

Various of the above-mentioned and further features and advantages will be apparent to those skilled in the art from the specific apparatus and its operation or methods described in the examples below, and the claims. Thus, the present invention will be better understood from this description of the following specific embodiments, including their drawing figures (which are approximately to scale) wherein:

Figure 2:
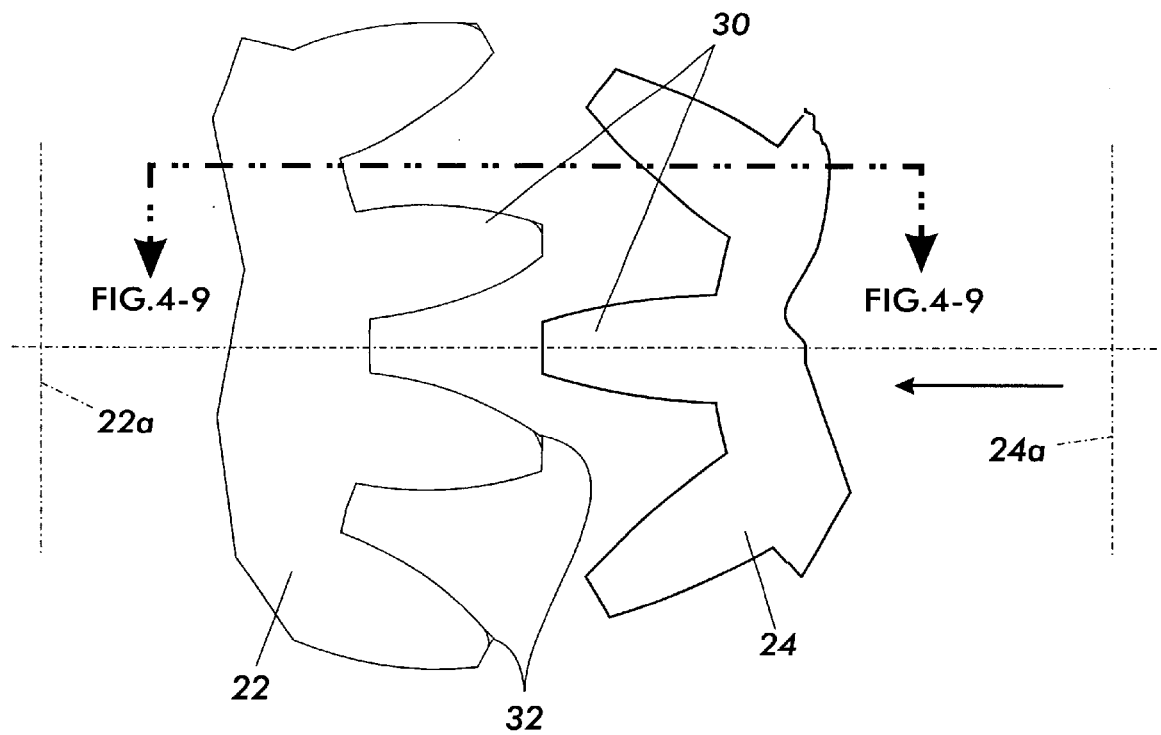
FIG. 2 is an enlarged partial view of two normally meshed gears of an exemplary drive system of FIG. 1, but illustrated with the gears separated from one another instead of meshed, and showing by the arrow-headed dashed line labeled "4-9" the view direction and position for FIGS. 4–9 (which are enlarged top views of opposing gear teeth)
Figure 3:
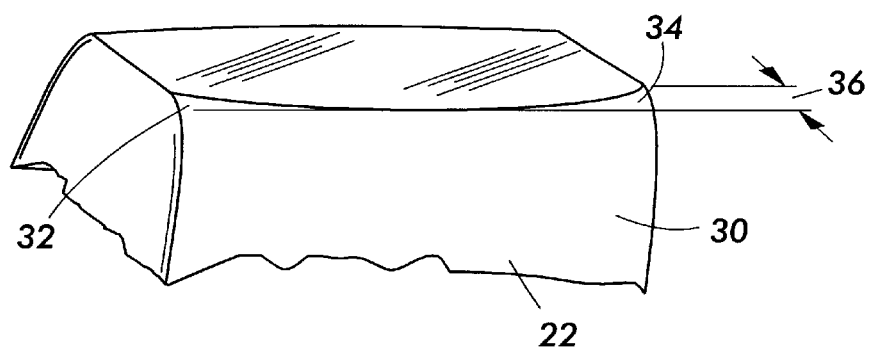
FIG. 3 is an enlarged perspective view of the outer end of a single gear tooth showing an example of the subject gear tooth crowning at both outer edges or corners of the gear tooth, with the space between the facing arrows showing the amount of such crowning, which is exaggerated here for illustrative clarity.
Figure 4:
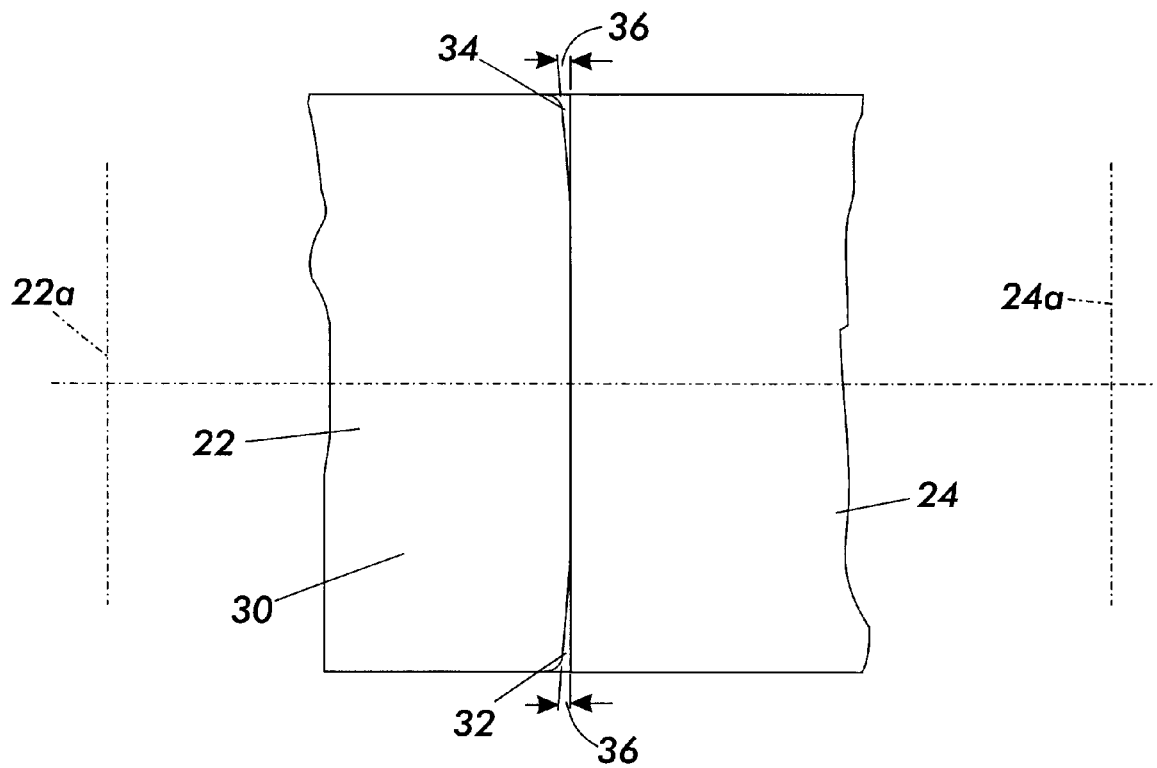
FIG. 4 is a partial top view of the gear tooth of FIG. 3 and a mating driven gear tooth, with parallel gear axes, taken along the line "4-9" of FIG. 2 as described above.
Figure 5:
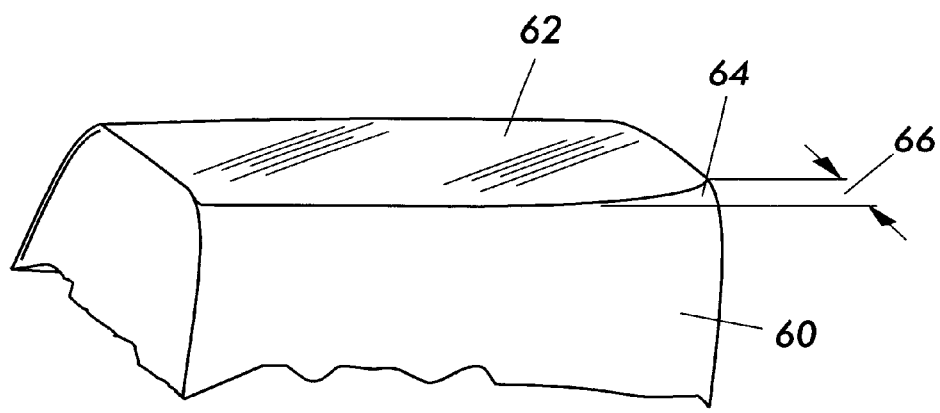
Figure 6:
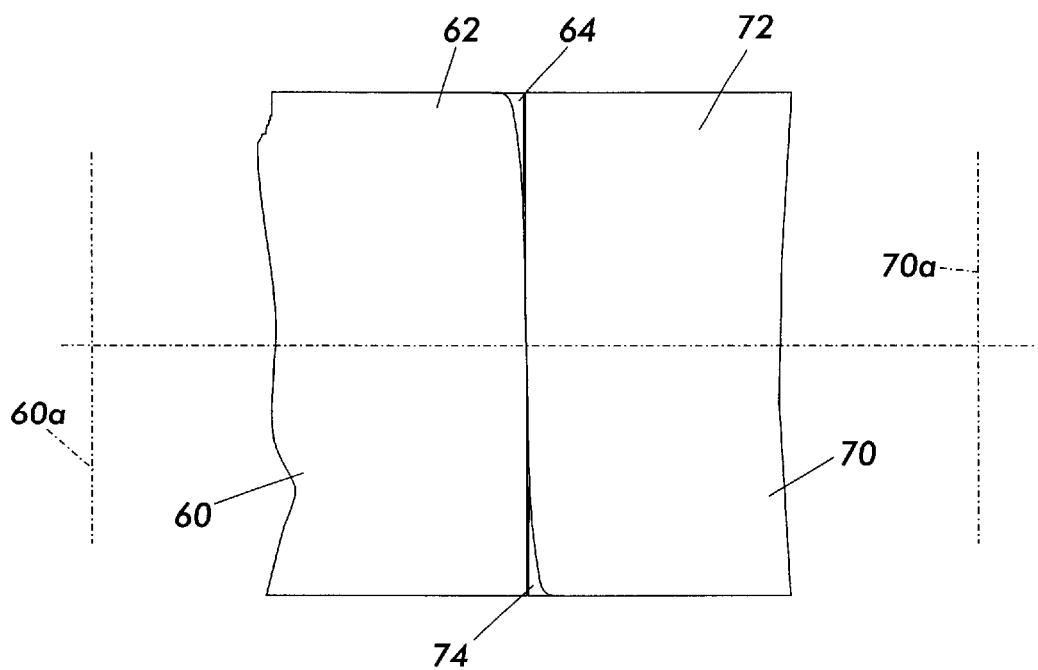
Figure 7:
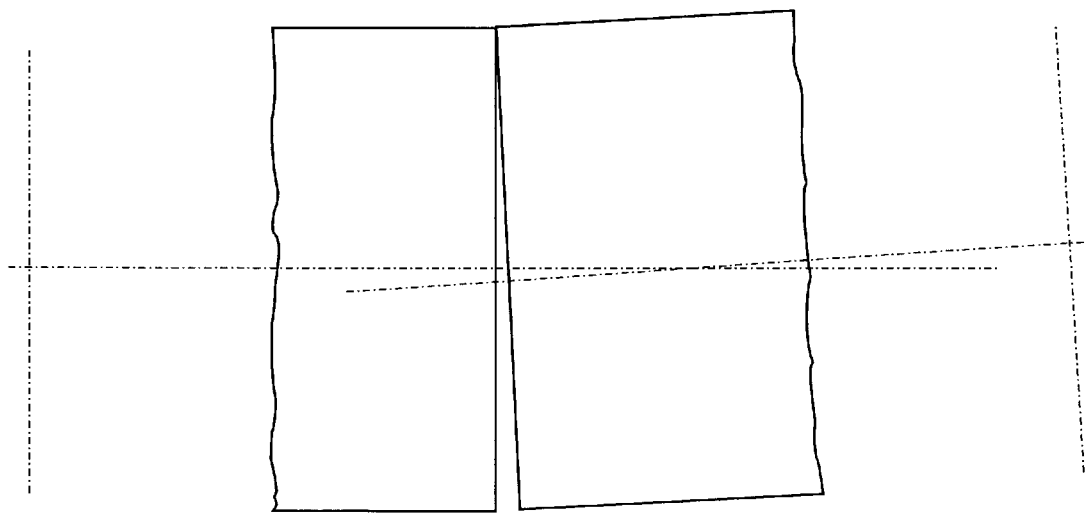
Figure 8:
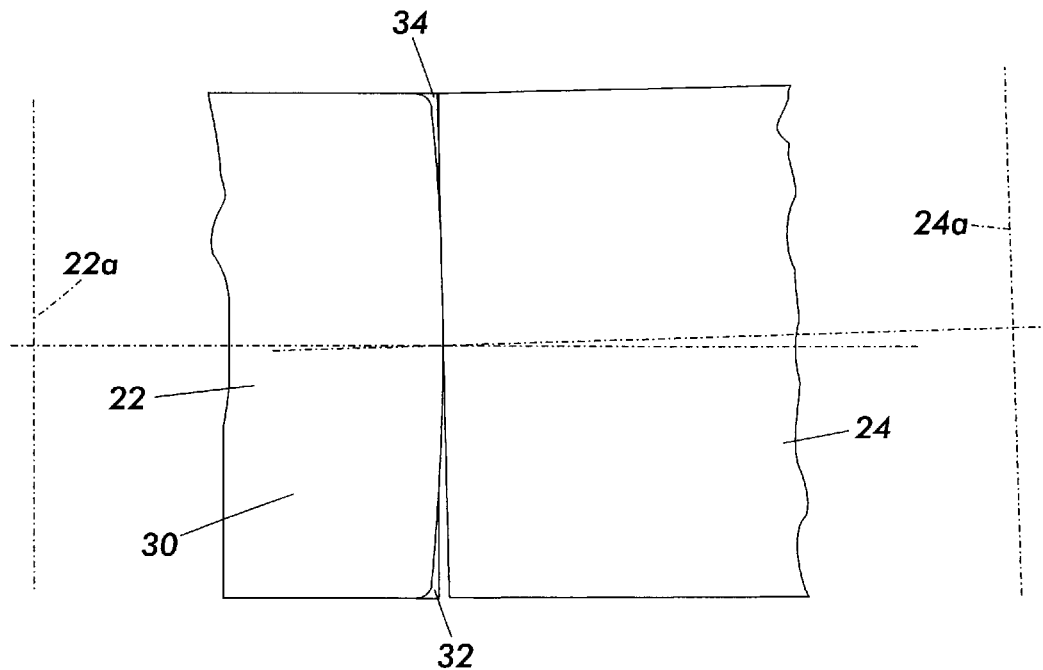
Figure 9:
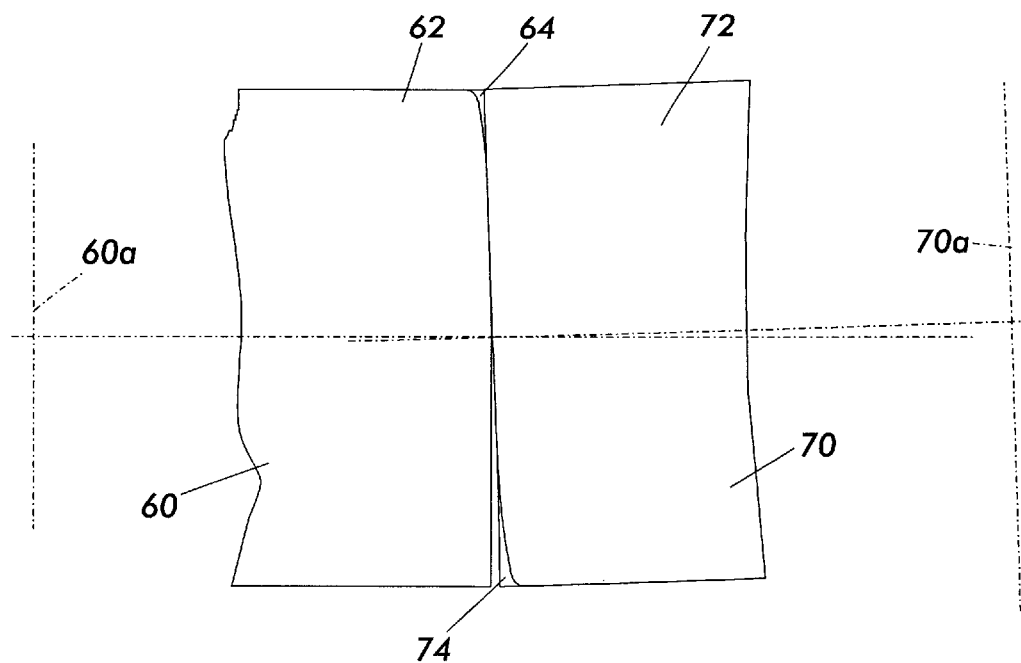

FIG. 5 is an otherwise similar view to that of FIG. 3, but illustrating an example of the subject gear tooth crowning at only one side of the gear tooth, FIG. 6 is a partial top view of the half-crowned gear tooth of FIG. 5 and a mating driven gear tooth which is oppositely half-crowned on its opposite tooth edge side, in a partial top view, taken along the line "4-9" of FIG. 2 as described above, with parallel gear axes;

FIG. 7, labeled "Prior Art", is similar to the views of FIGS. 4 and 6 but shows two gear teeth of a mating gear set which do not have any gear crowning and have non-parallel, miss-aligned, respective gear axes as respectively shown in dashed lines and even more clearly shown by the two additional respective dashed lines perpendicular to the gear axes (in the respective normal or face plane of the two gears), which latter dashed lines are shown at an angle to one another;

FIG. 8 is similar to FIG. 7, but illustrating the double gear tooth crowning of FIGS. 3 and 4 compensating for the same gear axes misalignment as is shown FIG. 7; and FIG. 9 is similar to FIGS. 7 and 8, but illustrating the single, half gear, tooth crowning of FIGS. 5 or 6 with opposite side crowning, for compensating for the same gear axes misalignment as is shown in FIG. 7.

Figure 1:
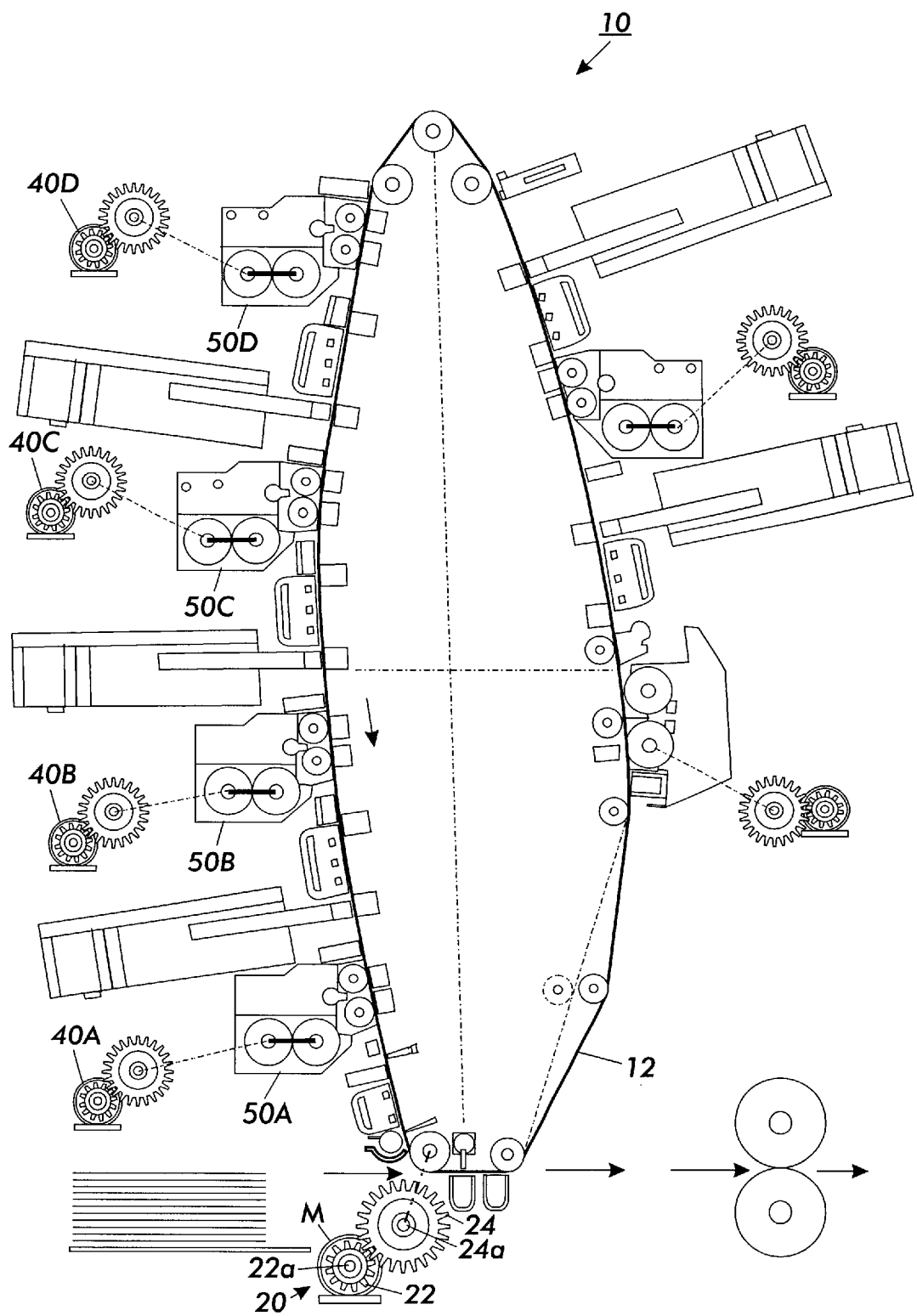
FIG. 1 is a frontal view of exemplary known patent drawing of an exemplary color printer 10, on which there is schematically illustrated some examples of applications of the subject improved drive system for improved motion control in printers, especially for the imaging surface, which in this case is the photoreceptor.

Describing now in further detail the exemplary embodiments with reference to the Figures, there is shown in FIG. 1 an exemplary printer (reproduction machine) 10, by way of showing examples of applications of the subject improved drive system for improved motion control of motion critical components, in particular, the photoreceptor 12. In this example, a simplified drive system 20 for the photoreceptor 12 is shown, with a pinion gear 22 (driven by a drive motor "M") and its mating driven gear 24, with substantially parallel respective axes of rotation 22a and 24a. The pinion gear 22 has crowned teeth edges (as will be further described herein with reference to other, enlarged, views). This drive system 20 provides improved motion control driving of the photoreceptor 12 imaging surface even with substantial variations in displacement from the parallel (misalignment) of gear axis 22a relative to gear axis 24a. (Such mating gear axis alignment variations are inherent in manufacturing and installation tolerances, especially for lower cost systems.)

Merely as examples, other such exemplary drives 40A, 40B, 40C, and 40D are schematically shown driving the image developer units 50A, 50B, 50C, 50D of this exemplary printer 10 in this example of FIG. 1. Various other motion uniformity critical components of the printer 10 may be driven in this same general manner, such as various paper path drives.

With reference to the other Figures and their above descriptions, FIGS. 3 and 4 show the outer end of a single gear tooth 30 of pinion gear 22 with gear tooth edge crowning 32 and 34 by an amount 36 (exaggerated for visibility) at both outer edges or corners of the gear tooth 30. FIG. 4 illustrates the situation for the opposing gear teeth of the drive system 20 with the gear axes 22a and 24a aligned, whereas FIG. 8 illustrates the situation for a misalignment of the axes 22a and 24a.

FIGS. 5, 6 and 9 show a different example of a motion smoothing drive system with a gear set of two oppositely half-crowned mating gears 60 and 70, with axes of rotation 60a and 70a. In FIG. 5 there is shown one gear tooth 62 of the gear 60, with lead edge crowning 64 by an amount 66 (exaggerated for visibility) along only one side to the outer edge or corner of the gear tooth 60. This is preferably a circular lead crowning. The gear 70 gear tooth 72 is similarly half-crowned 74, but on the opposite side of the tooth 72 from the mating tooth 62 of gear 60. As will be further described below, FIG. 6 illustrates the situation in which the opposing half-crowned gear teeth of this drive system have the mating gear axes 60a and 70a aligned, whereas FIG. 9 illustrates the situation of a misalignment of the axes 60a and 70a.

In both of the above-described embodiments, the gear crowning, by removing what would otherwise be gear tooth material from the edges of the gear teeth, causes the misaligned gear teeth to contact more towards the center of the face width of the gear teeth even though they have a skewed engagement. To express it another way, this longitudinal crowning across the face of the tooth forms a tooth which is slightly thinner at one or both ends of the tooth than in the middle of the tooth, thereby moving the load transmission to the middle of the gear teeth and avoiding end loading problems when the gear shafts are misaligned. The crowning is not done in the center of the gear tooth. The crowning can be any suitable arcuate tapering shape increasing towards the tooth side edge, such as straight, parabolic or circular crowning. Helical gears will, of course, require a corresponding difference in crowning.

In contrast, with un-crowned (flat) gear teeth the mating gear teeth engage across their entire width only with true or near perfect gear alignments, and otherwise the contact pattern is primarily at the edges of the teeth.

With a unidirectional drive system 20 only a lead crown is needed. That is, only on the driving side of the gear teeth need be crowned. For bi-directional drives the other side of each tooth can be edge crowned in the same manner, if desired, assuming that motion control is critical in the reverse driving direction.

As noted above, the half-crowned gears of the embodiments of FIGS. 5, 6 and 9, or the like, are particularly desirable for low cost plastic molding in a simple mold, which can also avoid parting line flashing along the tooth center. The half-crown can be at the top of the mold to provide mold clearance. In the illustrated half-tooth-width crowning of those Figs., there is crowning on only one side of each gear. However, as shown, opposing (meshed) gears may be reverse mounted or reverse molded to provide gears which, when meshed, have the crowned side of one gear opposing the uncrowned side of the other gear, as shown in FIGS. 6 and 9. The two mating half-crowned gears in this combination emulate and provide the contact pattern and drive performance of a full circular crowned gear (as in the other embodiment), forcing the tooth contact well within the face width dimension of both gears even with gear shaft misalignment. The respective gears may, of course, be marked to show their desired inboard and outboard sides, so that in assembly they will be properly mounted with opposing rather than mating crowned sides.

Initial testing of a disclosed embodiment has demonstrated that 75 to 100 microns of gear tooth outer edge (corner) crowning can yield up to a 15× (fifteen times) improvement in allowable motion transmission errors for a printer drive system for a "worse case" situation of mating gear axes misalignment within easily achievable manufacturing and assembly tolerance specifications.

Lead edge crowning on the order of 75 microns has been found to improve the gear alignment latitude by 10× (+−0.001 mm/mm total tolerance of allowable gear skew has been relaxed to +/−0.005 mm/mm). This tolerance is defined as the in plane displacement deviation of one edge of the tooth divided by the total face width of the gear. As predicted in gear models and demonstrated in hardware, the motion quality performance of the gears remains unchanged in this range, exhibiting 0.02% to 0.04% dV/V performance in lieu of a 0.25% performance goal, where dV is the measured velocity error on the photoconductor and V is the nominal process velocity. For critical motion quality applications such as a photoconductor drum or belt, typical performance goals for this ratio are ≦0.25% dV/V.

While the embodiments disclosed herein are preferred, it will be appreciated from this teaching that various alternatives, modifications, variations or improvements therein may be made by those skilled in the art, which are intended to be encompassed by the following claims.

What is claimed is:

1. In a printing apparatus with at least one component having critical drive motion uniformity and a drive system providing drive motion to said component having said critical drive motion uniformity; the improvement wherein:

said drive system comprises at least one engaged pair of rotatable first and second drive gears with substantially parallel respective first and second axes of gear rotation, said first and second axes having slight alignment variations relative to one another, and wherein at least said first drive gear has gear teeth having at least one crowned outer edge, said gear tooth outer edge crowning being sufficient to substantially increase said drive motion uniformity of said drive system in spite of said alignment variations of said first and second axes of gear rotation.

2. The printing apparatus of claim 1, wherein said gear teeth of said first drive gear have two crowned outer engagement edges.

3. The printing apparatus of claim 1, wherein said rotatable first and second drive gears are oppositely lead circular half-crowned.

4. The printing apparatus of claim 1, wherein said component with said critical drive motion uniformity is an imaging surface.

5. The printing apparatus of claim 1, wherein said gear teeth of said first drive gear have outer edges which are substantially linear other than at said crowned outer edge.

6. The printing apparatus of claim 1, wherein said component with said critical drive motion uniformity is a photoreceptor belt.

7. The printing apparatus of claim 1, wherein said rotatable first and second drive gears are oppositely half-crowned, and are plastic molded gears.

8. The printing apparatus of any of claims 1–7, wherein said crowning is at least approximately 75 microns.

9. The printing apparatus of any of claims 1–7, wherein said crowning is in the range of approximately 75–100 microns.

10. The printing apparatus of any of claims 1–7, wherein the only gears in said drive system are said first and second gears.

* * * * *